Figures 1, 2:
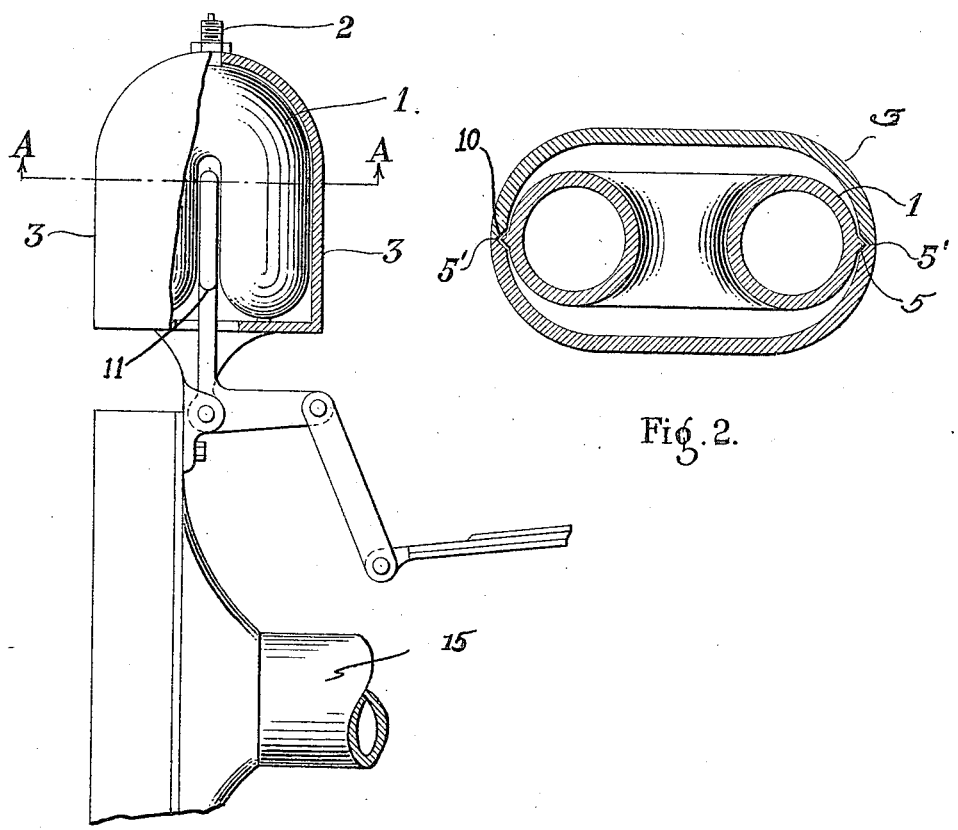

Dec. 4, 1928.

J. A. HEANY 1,693,603

ANTIFRICTION AIR SPRING ASSEMBLY

Original Filed Dec. 31, 1921

John Allen Heany
INVENTOR.

BY
Chester W. Burcela
ATTORNEY.

Patented Dec. 4, 1928.

1,693,603

UNITED STATES PATENT OFFICE.

JOHN ALLEN HEANY, OF NEW HAVEN, CONNECTICUT, ASSIGNOR TO HEANY LABORATORIES, INC., OF NEW HAVEN, CONNECTICUT, A CORPORATION OF CONNECTICUT.

ANTIFRICTION AIR-SPRING ASSEMBLY.

Application filed December 31, 1921, Serial No. 526,442. Renewed April 13, 1927.

The present invention relates to a pneumatic shock absorber adapted to be inserted in spring suspensions of vehicles; and has for its object to provide means, located between a casing or other supporting device and the pneumatic receptacle, such as a rubber or rubber compound tube or other container for the air, gas, or fluid medium, which means will operate to prevent relative movement between the supporting means and the flexible tube, to reduce friction, to prevent sidewise movements tending to dislocate the relative position of tube and casing or compressing or operating member relative to the cushion or rubber tube, to insure that the reaction of the tube will always be central with respect to the compressing or pressure means, and to provide means to operate, also, as a guide tending to properly position the relative parts after successive movements in operation.

Various other objects are within the scope of this invention, such as relate to the arrangement of the related elements or structures, and to various details of construction, and to economies of manufacture and numerous other features, as will be apparent in consideration of the drawings and related description of one form of the invention which may be preferred.

In the drawings Fig. 1 represents a sectional longitudinal view of the invention and Fig. 2 is a cross section on the line A, A of Fig. 1.

In Fig. 1, 1 represents a rubber or rubber compound tube herein shown as U-shaped in general outline, being located within a suitable casing or container or positioning member 3. A suitable valve 2, similar, if desired, to an ordinary tire valve, may be employed for inflating the pneumatic tube 1.

The tube 1 is shown as provided with a fin or rib, extending around the outside surface as shown at 5. The casing 3, which may be made in two parts fitted together at 5', and held together by suitable bolts and screws as may be deemed expedient, is recessed or grooved on the inside at 10, to provide a recess corresponding to the fin 5 located on the tube or U-shaped bag 1.

An operating member or compressing element 11 is located between the legs of the pneumatic U-shaped tube; and the casing 3 and element 11 are adapted to receive relative movements from members, between which it is desired to dampen or prevent relative movement.

The operation of the device will readily be understood from the foregoing. It will be seen that relative movement between the axle 15 and casing 3 causes the compressing element 11 to press against one or the other of the legs of the U-shaped pneumatic tube, the pressure thereof resisting movement of the element 11. The rib 5 fitting within the groove 10 of the casing for the tube during such operation tends to maintain the tube in proper position or clamps the same against sidewise or lateral, or other movements between the casing and tube which would otherwise cause undue wear and friction between the casing and the tube. This is of immense practical value because of the character of the material used for the pneumatic cushion, and because of the fact that the device may be constantly subjected to small or "chattering" movements between the relatively moveable members, which it is desired to dampen, as well as the longer period movements, or ordinary flexures, which it is the object of the ordinary shock absorber for motor vehicles to dampen, deaden, or absorb. It is, moreover, apparent that when an extreme depression or relative movement takes place between the compressing member and the casing, tending to move one side of the U-shaped tube entirely away from the casing, the rib and groove form a guide to restore the parts to their proper normal position, upon the release of the pressure.

It is apparent that within the spirit of the invention, many modifications and arrangements may be made other than as herein disclosed, and the present disclosure is illustrative merely, the invention itself comprehending all possible variations within the purview of mechanical skill, many of which will be apparent at once.

This invention is an improvement over the invention shown and described in my co-pending application entitled "Air spring shock absorber" Serial No. 487,491, filed July 25, 1921, in which I reserve the right to claim the construction broadly.

Having thus described my invention, what I desire to secure by Letters Patent of the United States and claim, is:

1. In a shock absorber, a casing, a pneumatic cushion supported loosely within said casing, means located between the cushion and the casing tending to prevent lateral relative movements therebetween.

2. In a pneumatic shock absorber an inflatable pneumatic tube, a casing loosely supporting said tube, means for contracting said tube and a rib and groove forming a loose connection between said tube and casing whereby said casing and tube are maintained in said relationship.

3. In a pneumatic shock absorber a casing, a rubber tube loosely positioned in said casing, a groove in said casing, a rib on said tube adapted to properly position the tube in said casing and prevent lateral movements thereof.

4. In a shock absorber, the combination of a casing having a grooved channel formed interiorly thereof, a resilient member enclosed by and movable bodily within said casing, and a projecting rib formed on said resilient member adapted to cooperatively engage said channel and maintain said member and casing in a predetermined relative position, said casing having a cross sectional area greater than that of the tube.

5. A shock absorber, comprising a casing, a U-shaped resilient member within said casing, means including a reciprocatable element for operating on said resilient member, and interengaging elements between said casing and member adapted to maintain the operating means, resilient member and casing in proper operative relationship, said casing having a cross sectional area greater than that of the tube.

6. A shock absorber, comprising a casing, a U-shaped resilient member within said casing, means for operating on said resilient member, and a rib and groove connection between said casing and resilient member, the exterior of said tube and the interior of said casing being curvilinear in contour, the casing having greater radius of curvature than the tube.

7. A shock absorber, comprising a casing, a U-shaped resilient member within said casing, means for operating on said resilient member, and means interposed between said casing and resiliently operative to reduce friction therebetween, including a projecting rib on the periphery of said resilient member and a groove formed on the inner periphery of said casing.

8. A shock absorber, comprising a casing, a U-shaped resilient member within said casing subject to intermittent compressions, and means for diminishing friction between said member and casing, including cooperating rib and groove members on said casing members.

9. A shock absorber, comprising a casing, a pneumatic tube within said casing, means for transmitting intermittent compressions to said tube, and a rib and groove connection between said tube and casing adapted to retain positively said tube in a central position relative to said casing.

10. In a shock absorber a casing; a resilient cushion loosely mounted therein; and means to limit the movement of said cushion with respect to said casing to one direction only.

11. A connection and support between the parts of a vehicle, one of which parts is to be connected to and supported by the other part, comprising interconnected, inflatable, cushion members carried with one part and closely engaging opposite sides of the other part, to maintain said other part in a given plane, and means to limit the motion of said cushion member in one direction only with respect to said first part.

12. In a shock absorber for vehicle spring suspensions, a casing, a resilient U-shaped gas bag supported in said casing, means to compress all of the gas in said bag upon relative movement in either direction between a vehicle and the running gear herefor, and means to permit movement of said bag with respect to said casing in one direction only.

In testimony whereof, I affix my signature.

JOHN ALLEN HEANY.